Dec. 10, 1968  J. F. GILEWSKI ET AL  3,415,164
COMPENSATING VALVE
Filed March 1, 1967
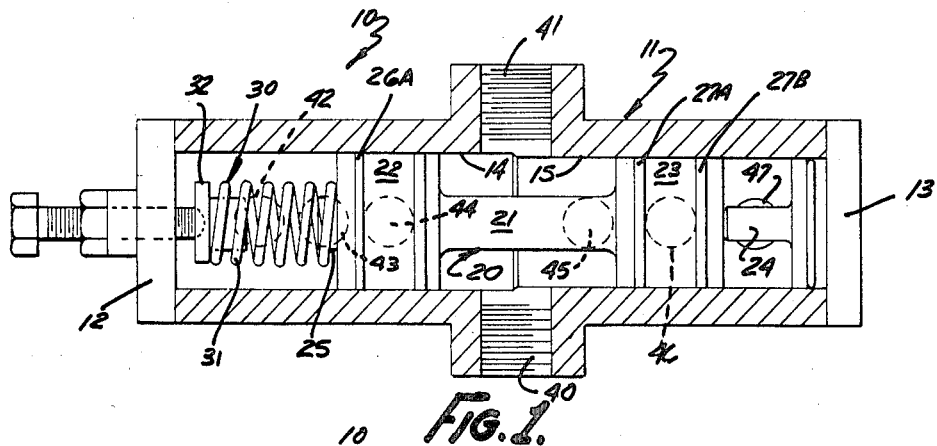
FIG. 1.
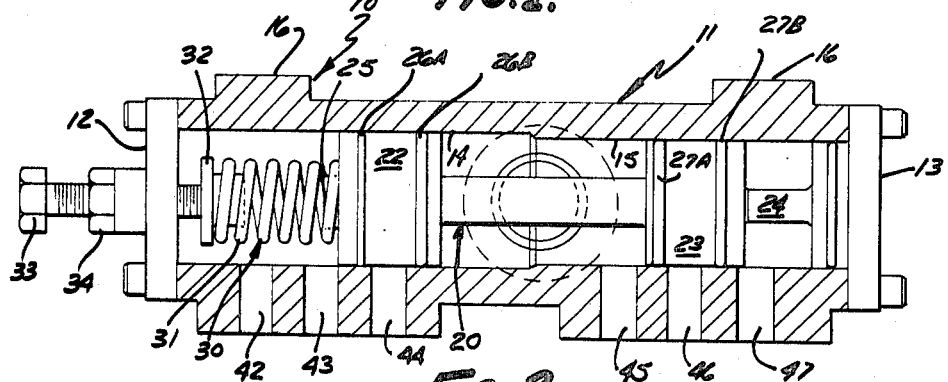
FIG. 2.
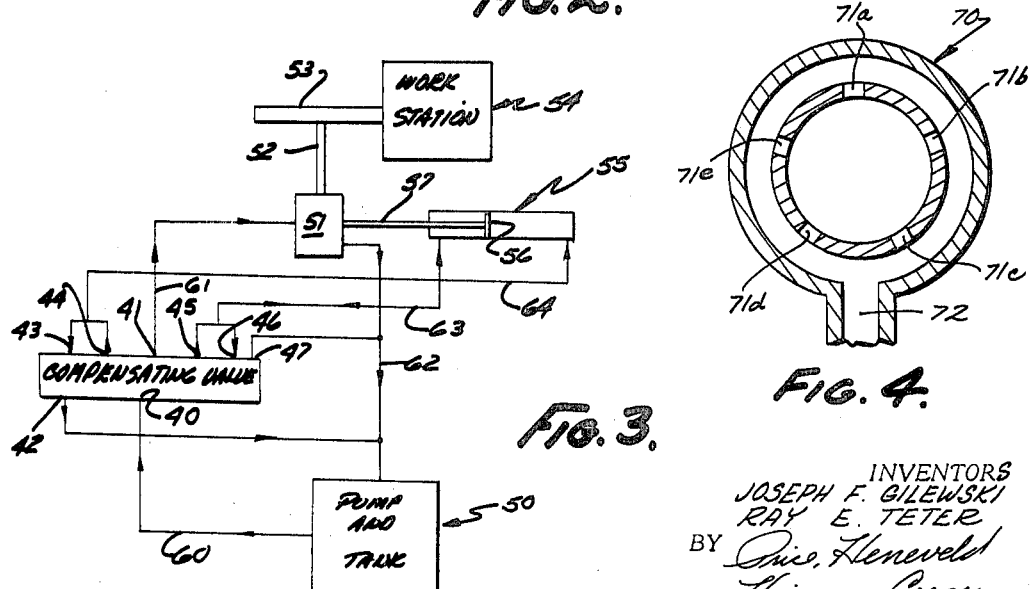
FIG. 3.
FIG. 4.
INVENTORS
JOSEPH F. GILEWSKI
RAY E. TETER
BY Price, Heneveld
Huizenga, Cooper
ATTORNEYS

United States Patent Office 3,415,164
Patented Dec. 10, 1968

3,415,164
COMPENSATING VALVE
Joseph F. Gilewski, Grand Rapids, and Ray E. Teter, Lake Leelanau, Mich., assignors to Electrical & Mechanical Service Co., Grand Rapids, Mich., a corporation of Michigan
Filed Mar. 1, 1967, Ser. No. 619,701
10 Claims. (Cl. 91—412)

ABSTRACT OF THE DISCLOSURE

A compensating valve including a dumbbell-shaped piston arrangement having first and second pistons at either end of a common connecting rod. One of the pistons has a larger cross-sectional area than the other of the pistons and the piston arrangement is positioned slidably within a housing. Inlet and outlet ports are provided within the housing centrally of the two pistons and these ports are connected in series with a hydraulic supply line to a device such as a buffer. The pressure within the supply line causes the piston arrangement to shift within the housing to selectively open and close control ports. The control ports control a second hydraulic device such as a hydraulic cylinder utilized to move the buffing head into and out of abutment with the workpiece.

---

This invention relates to hydraulic compensating valves and, more particularly, to a valve particularly adapted to sense the load on a hydraulic mechanism and to selectively operate a second mechanism in response thereto.

In the utilization of hydraulic mechanisms, it is often desirable to monitor the load on a particular mechanism and to automatically increase or decrease that load in accordance with a predetermined program. Thus, for example, in the buffing art, the buffing wheel is ordinarily rotated by means of a hydraulic motor and pushed into contact with the work piece by means of a hydraulic cylinder or like device. Ordinarily, the pressure exerted by the cylinder and, thus, the pressure exerted on the work piece by the buffing wheel, will be controlled by an operator, or alternatively, by a pre-programmed series of pressure steps completely insensitive to changes in configuration of the work piece, changes in the stiffness of the buffing wheel, and the like. The drawbacks of systems of these types are evident and merit little comment. If an operator is required to constantly monitor the load on the buffing apparatus, the costs incurred in executing a particular buffing operation increase markedly. Even if such an operator is supplied, the degree of precision with which he can control the pressure of the buffing wheel on the work piece is not satisfactory in many situations. If, on the other hand, an automated positioning program is utilized, the expenses incurred in developing the program and the differentials in applied pressure due to unavoidable inaccuracies in systems of this type render this scheme of operation questionably profitable at best.

It is an object of this invention, therefore, to provide a compensating valve suitable for monitoring the load on a particular hydraulic device and adjusting that load in response to a predetermined standard.

It is an object of this invention to provide a valve of the type described which is capable of automatically adjusting a hydraulic device to increase or decrease the load thereon in response to monetary loading conditions and independent of the particular operational sequence being employed.

More particularly, it is an object of this invention to provide a device capable of constantly monitoring the pressure in the hydraulic supply line to the hydraulic mechanism being controlled and making appropriate adjustments in that device in response to pressure differentials in the line.

It is another object of this invention to provide a device of the type described particularly adapted for utilization in a buffing environment capable of moving the buffing wheel into closer or more distant proximity with respect to the work piece in response to monetary pressures being exerted upon the work piece by the buffing wheel and in accordance with predetermined loading standards.

These, as well as other, objects of this invention will be readily apparent to those skilled in the art by reference to the following specification and accompanying figures in which:

FIG. 1 is a side-elevational view, partially in cross section, of the compensating valve which is the subject of this invention;

FIG. 2 is a plane view, partially in cross section, of the compensating valve;

FIG. 3 is a schematic diagram illustrating the utilization of the compensating valve in a buffing environment; and FIG. 4 is a fragmentary cross-sectional view of a modified form of the invention.

Briefly, the compensating valve which is the subject of this invention comprises a dumbbell-shaped piston arrangement having first and second pistons at either end of a common connecting rod. One of the pistons has a larger cross-sectional area than the other. The piston arrangement is slidably disposed within a housing having first and second cylinder wall sections which slidably mate with and closely abut the first and second pistons.

The housing is provided with intake and outlet ports centrally located with respect to the first and second pistons and, ordinarily, these ports are connected in series with the hydraulic supply line for the device upon which the load or the like is to be monitored. Means are provided for biasing the piston arrangement into a predetermined position within the housing, but, due to the differential cross-sectional area of the pistons, these means are overcome and the piston slid within the housing when the pressure between the intake and outlet ports exceeds a predetermined value.

Control ports are provided in the housing in such a manner that they are adapted to be closed and opened selectively by the movement of the piston arrangement in response to load changes on the hydraulic device being monitored. These control ports, of course, are operatively connected to the same or another type of hydraulic device which is operated in response to the sensed pressure.

Referring now to the figures, a preferred embodiment of this invention will be described in detail. FIGS. 1 and 2 illustrate the novel compensating value 10 which comprises a generally circular housing 11 having end caps 12 and 13 suitably affixed thereon. The interior of housing 11 is divided into a pair of cylinder sections 14 and 15, the cross-sectional areas of which differ as will become apparent hereinafter. Conveniently, housing 11 may be affixed at its working position by means of a pair of mounting brackets 16.

Disposed within housing 11 is a dumbbell-shaped piston arrangement indicated generally by the reference numeral 20. Piston arrangement 20 comprises a central common connecting rod 21 having a first piston 22 affixed to one extremity thereof and a second piston 23 affixed to the other extremity thereof. Piston 22 has a larger cross-sectional area than piston 23. Piston 22 is slidably accommodated within cylinder section 14 and piston 23 is likewise slidably accommodated within cylinder section 15.

A stop 24 having a section of limited cross section extending into housing 11 is provided for limiting the movement of piston arrangement 20 to the right as viewed in FIGS. 1 and 2. The exterior end of piston 22 is provided with a spring mount, indicated generally by the reference numeral 25, for receiving and retaining compression spring 31 to be discussed hereinafter. Sealing of the pistons with respect to their mating cylinder walls is effected by conventional sealing gaskets or rings. Thus, piston 22 is provided with seals 26A and 26B and piston 23 is provided with seals 27A and 27B. The seals operate, at is well-known in the art, to prevent leakage of the hydraulic fluid between the piston and the adjacent periphery of the cylinder wall.

A biasing spring assembly, indicated generally by the reference numeral 30, is provided to bias the piston arrangement 20 to the right as viewed in FIGS. 1 and 2 and, thus, into abutment with stop 24. The biasing assembly 30 comprises a compression spring 31 which receives and is retained by spring mount 25 on the exterior surface of piston 22. The opposite extremity of compression spring 31 receives a cap 32 and the entire assembly is adjustably depressed by means of an adjustment bolt 33 threaded in a suitable collar formed integrally with end cap 22. Conveniently, a locking nut 34 may be provided for insuring positive positioning of adjustment bolt 33.

Suitable monitoring and control ports are provided along the length of the housing 11. An inlet port 40 and an outlet port 41 are provided centrally of the pistons 22 and 23. As will become apparent hereinafter, these ports will generally be connected in series with the hydraulic supply lines to the hydraulic device being monitored. A plurality of control ports, 42 through 47, are provided in the sides of cylinder walls 14 and 15. Control ports 42 through 47 are adapted to be selectively opened and closed by the movement of piston arrangement 20 to the left and then back to the right as viewed in FIGS. 1 and 2.

By way of illustration, assume that the compensating valve 10 shown in FIGS. 1 and 2 is to be utilized in a buffing environment as indicated in FIG. 3. The work piece which is to be buffed is located at work station 54. A suitable pump and supply tank 50 supplies pressurized hydraulic fluid to a buffing motor 51 causing it to rotate. The rotation of motor 51 is transferred via shaft 52 to a buffing wheel 53 which abuts and polishes the work piece 54. The motor 51, its attached shaft 52 and, thus, the buffing wheel 53 are attached to the connecting rod 57 of a conventional two-way hydraulic cylinder 55. The piston 56 of hydraulic cylinder 55 and, thus, the buffing wheel 53 may be moved to the right or the left as viewed in FIG. 3 by suitable activation of cylinder 55. Thus, by selectively activating cylinder 55, the buffing wheel 53 may be brought into closer or more remote proximity to the work piece 54 as desired.

The pressure line 60 from the pump 50 is connected to the intake port 40 on the compensating valve 10. An extension 61 of this pressure line traverses from outlet port 41 of compensating valve 10 to the hydraulic motor 51 and the fluid returns from said motor to the tank 50 via line 62. Ports 45 and 46 are connected to the left-hand port of cylinder 55 via line 63 and ports 43 and 44 are connected to the right-hand port of cylinder 55 via line 64 (see FIG. 3). Ports 42 and 47 join return line 62 back to the hydraulic fluid reservoir.

In normal operation, the piston arrangement 20 will assume the position shown in FIGS. 1 and 2 of the drawings. In this position, the fluid within housing 11 central of pistons 22 and 23 flows to motor 51 causing it and the attached buffing wheel 53 to rotate and then back to tank 50. A portion of this fluid also exits from the housing via port 45 into line 63 causing cylinder 55 to tend to pull buffing wheel 53 into closer abutment with the work piece 54. As the buffing wheel 53 moves into this closer abutment, more torque is required to rotate motor 51 and, thus, the pressure in lines 60 and 61 and within compensating valve 10 central of pistons 22 and 23 increases. Because of the differing cross-sectional areas of pistons 22 and 23 exposed to this pressure increase, the entire piston arrangement 20 tends to move to the left as shown in FIGS. 1 and 2. When the wheel 53 abuts the work piece with sufficient firmness and, thus, when the pressure in lines 60 and 61 reaches a predetermined point determined by the setting of spring assembly 30, the poston arrangement 20 will overcome the compressive force of the spring and actually move toward the left in FIG. 2 to a point at which piston 23 opens port 46 and closes port 45 and piston 22 opens port 44 and closes port 43.

The movement of piston 20 to this position accomplishes two distinct results. First, it allows oil trapped in the left-hand side of cylinder 55 to flow from now open port 46 into the interior of the housing and out port 47 back to the supply tank to relieve pressure on the left-hand side of the cylinder. Second, it allows a portion of the fluid flowing in lines 60 and 61 to motor 51 to be diverted through port 44 to the right-hand port of cylinder 55 (as viewed in FIG. 3) and, thus, causes the buffing motor 51 and attached rotating wheel 53 to move to the left and away from the work piece as viewed in FIG. 3. The presence of piston 22 over port 43 during this period, of course, prevents the existence of a "short circuit" between the pump and the return tank in precisely the same manner as does the presence of piston 53 over port 46 when the piston arrangement is in the position shown in FIGS. 1 and 2.

As the wheel 53 is moved to the left as viewed in FIG. 3, the torque required to rotate motor 51 will decrease sharply due to the decrease in friction between buffing wheel 53 and the work piece 54. This reduction in required torque, in turn, will cause a pressure decrease in lines 60 and 61 and in that portion of the housing central of pistons 22 and 23. At this point, biasing spring 31 will force piston arrangement 20 back to the position illustrated in FIGS. 1 and 2 and the entire process will be repeated. The pressure at which withdrawal of buffing wheel 53 from work piece 54 begins can be adjusted, of course, by manipulating adjustment screw 33 to change effectively the spring constant of compression spring 31.

It will be noted from an examination of FIGS. 1 and 2 that the seals 26 and 27 are spaced on their respective pistons in such a manner that one seal lies on either side of the particular port being closed. This seal positioning, of course, markedly increases the effectiveness with which the ports may be sealed and, thus, increases the over-all efficiency of the compensating valve. Thus, when the valve has moved from its normal position shown in FIG. 1 to the position where port 43 is closed, seals 26A and 26B are positioned on opposite sides of port 43. Similarly, when the valve is in its release position, seals 27A and 27B are on opposite sides of port 45.

While the compensating valve has been illustrated in a buffing environment, it will be readily apparent to those skilled in the art that it will find usage in many other types of load monitoring environments. It is not intended, therefore, that the particular mode of working explanation limit the scope of the invention. In such other environments, it may be desirable to alter the location and number of the control ports 42 through 47 and this may be readily accomplished by those skilled in the art once a particular working environment has been analyzed.

A slightly modified form of the invention is illustrated in FIG. 4. The individual outlet ports 42 through 47 in some situations restrict the flow of fluid from the valve housing to the extent of detrimentally effecting the response time of the device. This can be circumvented by providing a plurality of circumferentially aligned ports 71a through 71e about the housing at any identical longitudinal position and enclosing them by means of a circular manifold 70 having an outlet 72 to which suitable connection is made in conventional manner. In this case, upon shifting of the piston, fluid may escape readily through all of the plurality of ports 71 and response time is substantially improved.

While a preferred embodiment of this invention has been illustrated in detail, it will be obvious to those skilled in the art that many other embodiments may be conceived and fabricated without departing from the spirit of this specification and the accompanying drawings. Such other embodiments are to be deemed as included within the scope of the following claims unless these claims, by their language, expressly state otherwise.

We claim:

1. Apparatus for monitoring the load on a first hydraulic device and selectively operating a second hydraulic device in response thereto, said apparatus comprising:
   a dumbbell-shaped piston arrangement having first and second pistons at either end of a common connecting rod, one of said pistons having a larger cross-sectional area than the other of said pistons;
   a housing surrounding said piston arrangement, said housing having a first cylinder wall section slidably mating with said first piston and a second cylinder wall section slidably mating with said second piston;
   means for baising said piston arrangement into a predetermined position within said housing;
   intake and outlet ports in said housing centrally located with respect to said first and second pistons, said ports adapted to be connected in series with the hydraulic supply line for said first hydraulic device whereby said piston arrangement will move within said housing against and under the influence of said biasing means in response to predetermined pressures within said supply line; and
   at least two control ports in said housing adapted to be closed and opened selectively by the movement of said piston arrangement, said control ports being operatively coupled to said second hydraulic device.

2. The apparatus set forth in claim 1 wherein said control ports are positioned within said cylinder walls and adapted to be covered and uncovered by the cylinder wall abutting sections of said piston arrangement during movement thereof.

3. The apparatus as set forth in claim 1 wherein said biasing means is adjustable whereby the values of the said predetermined pressures which cause said piston arrangement to move within said housing may be adjusted.

4. The apparatus as set forth in claim 1 which further comprises stop means positioned within said housing for limiting the movement of said piston arrangement under the influence of said biasing means.

5. The apparatus as set forth in claim 1 wherein the path of movement of said piston arrangement is limited in such a manner that an open space always exists within said housing at either extremity of said piston arrangement, at least one of said control ports communicating with each of said open spaces.

6. The apparatus as set forth in claim 1 wherein said first hydraulic device comprises a hydraulic motor having a buffing wheel affixed thereto adapted to rotatably contact a work piece and wherein said second hydraulic device comprises hydraulic means adapted to vary the spacing between said buffing wheel and said work piece and, thus, the pressure exerted by said buffing wheel thereon.

7. The apparatus as set forth in claim 6 wherein a series of three control ports are provided in the sidewall of each of said first and second cylinder wall sections, one of the ports in each of said series being continually open despite the position of said piston arrangement within said housing and the other two ports in each of said series adapted to be closed or opened depending upon the position of said piston arrangement.

8. The apparatus as set forth in claim 1 wherein said intake port communicates with at least one of said control ports when said piston arrangement is in a predetermined position.

9. The apparatus as set forth in claim 7 wherein said intake port communicates with one or the other of one of said series of control ports in said first and second cylinder wall sections depending upon the position of said piston arrangement.

10. The apparatus as set forth in claim 1 wherein each of said control ports comprises a plurality of circumferentially aligned apertures in said housing and a manifold surrounding said apertures, said manifold being operatively coupled to said second hydraulic device.

No references cited.

EDGAR W. GEOGHEGAN, *Primary Examiner.*

U.S. Cl. X.R.

137—118; 60—97